US012370852B2

(12) United States Patent
Kurihara

(10) Patent No.: US 12,370,852 B2
(45) Date of Patent: Jul. 29, 2025

(54) SPRING GUIDE AND METHOD OF MANUFACTURING SPRING GUIDE

(71) Applicant: KYB Corporation, Tokyo (JP)

(72) Inventor: Kenta Kurihara, Aichi (JP)

(73) Assignee: KYB CORPORATION, Tokyo (JP)

( * ) Notice: Subject to any disclaimer, the term of this patent is extended or adjusted under 35 U.S.C. 154(b) by 0 days.

(21) Appl. No.: 18/716,102

(22) PCT Filed: Dec. 9, 2022

(86) PCT No.: PCT/JP2022/045486
§ 371 (c)(1),
(2) Date: Jun. 3, 2024

(87) PCT Pub. No.: WO2023/112855
PCT Pub. Date: Jun. 22, 2023

(65) Prior Publication Data
US 2025/0042211 A1    Feb. 6, 2025

(30) Foreign Application Priority Data

Dec. 17, 2021    (JP) ................. 2021-205041

(51) Int. Cl.
B60G 15/06    (2006.01)
B29C 45/00    (2006.01)
B29L 31/30    (2006.01)

(52) U.S. Cl.
CPC ........ *B60G 15/063* (2013.01); *B29C 45/0005* (2013.01); *B29C 45/0046* (2013.01); *B29L 2031/30* (2013.01); *B60G 2202/312* (2013.01); *B60G 2204/1242* (2013.01); *B60G 2206/7101* (2013.01); *B60G 2206/81012* (2013.01); *B60G 2206/8201* (2013.01)

(58) Field of Classification Search
CPC ............ B60G 15/063; B60G 2202/312; B60G 2204/1242; B60G 2206/7101; B60G 2206/81012; B60G 2206/8201; B29C 45/0005; B29C 45/0046; B29L 2031/30
USPC .................................. 280/124.162
See application file for complete search history.

(56) References Cited

U.S. PATENT DOCUMENTS 10,513,052 B2*  12/2019  Suzuki ............... B29C 48/0012
2016/0023529 A1*  1/2016  Wilkin ..................... F16F 1/12
                                                                       267/221

(Continued)

FOREIGN PATENT DOCUMENTS

EP    3943775 A1    1/2022
JP    2018-105492 A    7/2018
(Continued)

OTHER PUBLICATIONS

JP-2020153467-A English translation and Original document (Year: 2019).*

*Primary Examiner* — Paul N Dickson
*Assistant Examiner* — Caitlin Anne Miller
(74) *Attorney, Agent, or Firm* — Rabin & Berdo, P.C.

(57) ABSTRACT

A spring guide made of fiber-reinforced resin, includes: a disc-shaped base portion configured to support a coil spring, the coil spring being configured to elastically support a vehicle body; and a barrel portion through which a cylinder of a shock absorber is inserted, in the barrel portion, the fiber-reinforced resin is oriented in a circumferential direction.

6 Claims, 7 Drawing Sheets

(56) References Cited

U.S. PATENT DOCUMENTS

| | | | |
|---|---|---|---|
| 2016/0185177 A1* | 6/2016 | Kaneko | B60G 15/063 |
| | | | 267/221 |
| 2017/0274719 A1* | 9/2017 | Broeckx | F16F 1/12 |
| 2018/0126816 A1* | 5/2018 | Kondo | B60G 11/16 |
| 2022/0024272 A1* | 1/2022 | Kurihara | F16F 9/58 |
| 2023/0067151 A1* | 3/2023 | Kurihara | F16F 1/126 |
| 2024/0033981 A1* | 2/2024 | Tanaka | B60G 15/063 |

FOREIGN PATENT DOCUMENTS

| | | |
|---|---|---|
| JP | 2020097975 A | 6/2020 |
| JP | 2020153467 A | 9/2020 |

* cited by examiner

SPRING GUIDE AND METHOD OF MANUFACTURING SPRING GUIDE

TECHNICAL FIELD

The present invention relates to a spring guide and a method of manufacturing the spring guide.

BACKGROUND ART

JP2018-105492A discloses a resin spring seat that is attached to a cylinder with a built-in damping mechanism and that supports a wheel-side end portion of a spring arranged between a vehicle body and a wheel. The resin spring seat described in Patent Literature 1 is formed with a cylindrical portion through which the cylinder is inserted.

SUMMARY OF INVENTION

With the resin spring seat as described in JP2018-105492A, when the cylinder is inserted through the cylindrical portion, a load acts on the cylindrical portion in the radial direction. Because the spring seat made of resin has a low strength and is brittle, there is a risk in that cylindrical portion is damaged when the cylinder is inserted through the cylindrical portion of the resin spring seat.

An object of the present invention is to improve a strength of a spring guide.

According to one aspect of the present invention, a spring guide made of fiber-reinforced resin, includes: a disc-shaped base portion configured to support a coil spring, the coil spring being configured to elastically support a vehicle body; and a barrel portion through which a cylinder of a shock absorber is inserted, in the barrel portion, the fiber-reinforced resin is oriented in a circumferential direction.

DESCRIPTION OF EMBODIMENTS

A spring guide 100 according to the embodiment of the present invention will be described with reference to the drawings. The spring guide 100 is provided on a suspension device 10. The suspension device 10 is a device that is installed on an automobile (not shown) for stably suspending a vehicle body by generating a damping force so as to absorb impacts and vibrations received from a road surface during a travelling of the vehicle.

Figure 1:
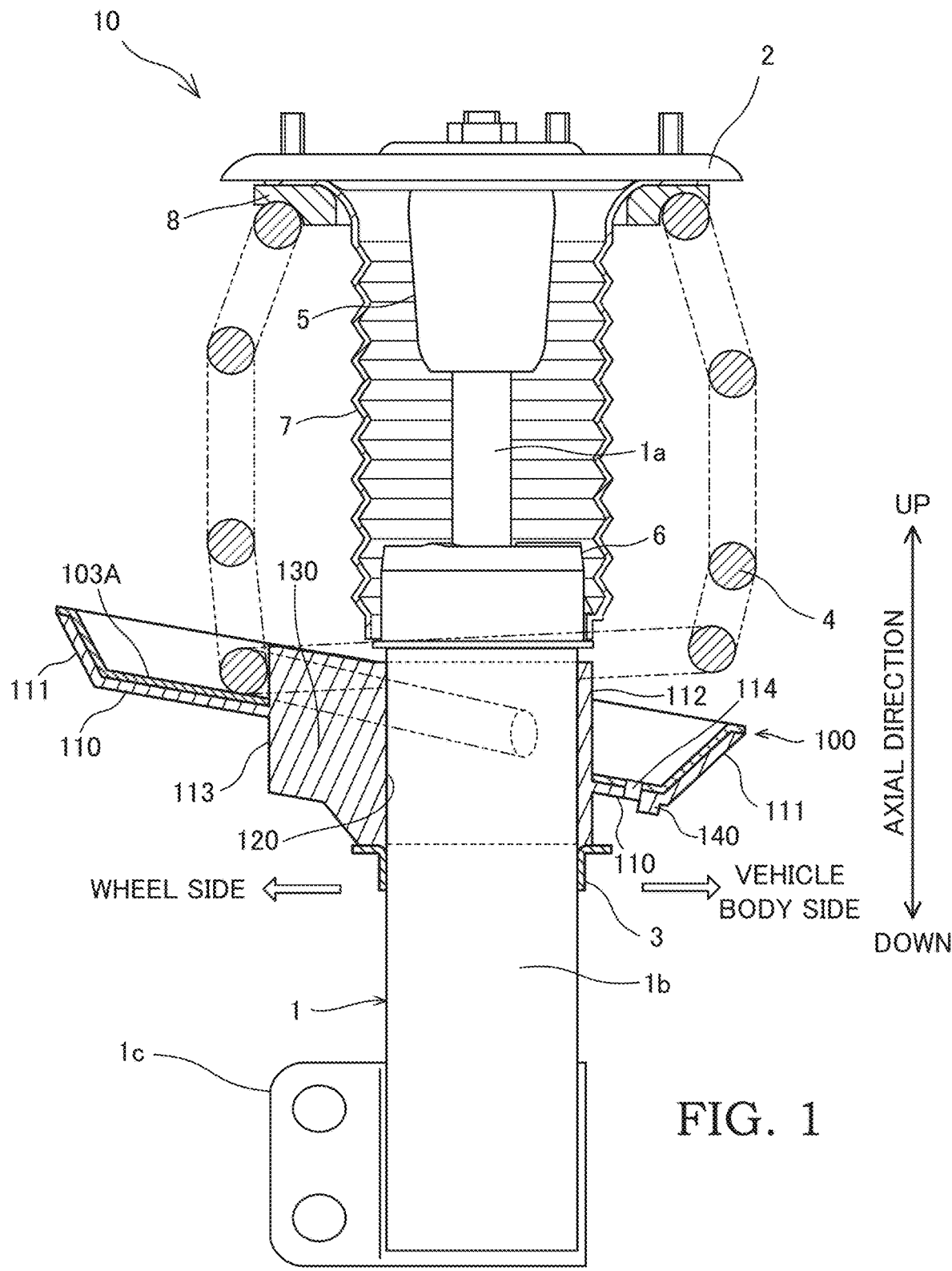
FIG. 1 is a partial sectional view of a suspension device according to an embodiment of the present invention.

FIG. 1 is a partial sectional view of the suspension device 10. As shown in FIG. 1, the suspension device 10 is provided with: a shock absorber 1 that is provided between the vehicle body and a wheel; an upper mount 2 that is attached to a tip end of a piston rod (hereinafter, referred to as a rod) 1a of the shock absorber 1; the spring guide 100 that is attached to an outer circumference of a cylinder 1b of the shock absorber 1; a coil spring 4 that is provided between the spring guide 100 and the upper mount 2 and that elastically supports the vehicle body; a bump cushion 5 that is fitted to the rod 1a and that restricts a stroke of the shock absorber 1 in a contracting direction; a bump stopper 6 that is fitted to an end portion of the cylinder 1b on the side of the rod 1a; and a tubular dust boot 7 that protects the rod 1a.

The shock absorber 1 has the cylinder 1b and the columnar rod 1a that projects out from an opening of the cylinder 1b. A piston (not shown), which that divides an interior of the cylinder 1b into an extension-side chamber and a contraction-side chamber, is linked to a lower end portion of the rod 1a.

An end portion of the cylinder 1b on the opposite side from the rod 1a side is provided with a knuckle bracket 1c that links the shock absorber 1 and a knuckle (not shown) for holding the wheel. For the sake of convenience of description, the vertical direction is stated such that the upper mount 2 side corresponds to the upper side of the suspension device 10 and the knuckle bracket 1c side corresponds to the lower side of the suspension device 10. The vertical direction of the suspension device 10 corresponds to the axial direction (the center axial direction) of the suspension device 10 and to the extending/contracting direction of the shock absorber 1. In addition, the radial direction of the suspension device 10 (the radial direction of the shock absorber 1) is the direction orthogonal to the axial direction of the suspension device 10. In the following, the axial direction of the suspension device 10 (specifically, the axial direction of the cylinder 1b) is also simply referred to as "the axial direction", and the radial direction of the suspension device 10 (specifically, the radial direction of the cylinder 1b) is also simply referred to as "the radial direction". In addition, the upper side in the axial direction of the suspension device 10 is also simply referred to as "the upper side", and the lower side in the axial direction of the suspension device 10 is also simply referred to as "the lower side".

The shock absorber 1 is assembled to the vehicle by being linked to the vehicle body via the upper mount 2 and by being linked to the knuckle by the knuckle bracket 1c. The shock absorber 1 configured as described above is configured so as to generate the damping force when the rod 1a is moved in the axial direction relative to the cylinder 1b. The suspension device 10 quickly attenuates the vibrations of the vehicle body by the damping force generated by the shock absorber 1.

The coil spring 4 is provided between the spring guide 100 and the upper mount 2. The coil spring 4 is sandwiched by the spring guide 100 and the upper mount 2 in a compressed state, thereby biasing the shock absorber 1 in the extending direction. A rubber sheet 8 is provided between the upper mount 2 and an upper end portion the coil spring 4. With such a configuration, the upper mount 2 is prevented from coming into direct contact with the coil spring 4.

Figure 2:
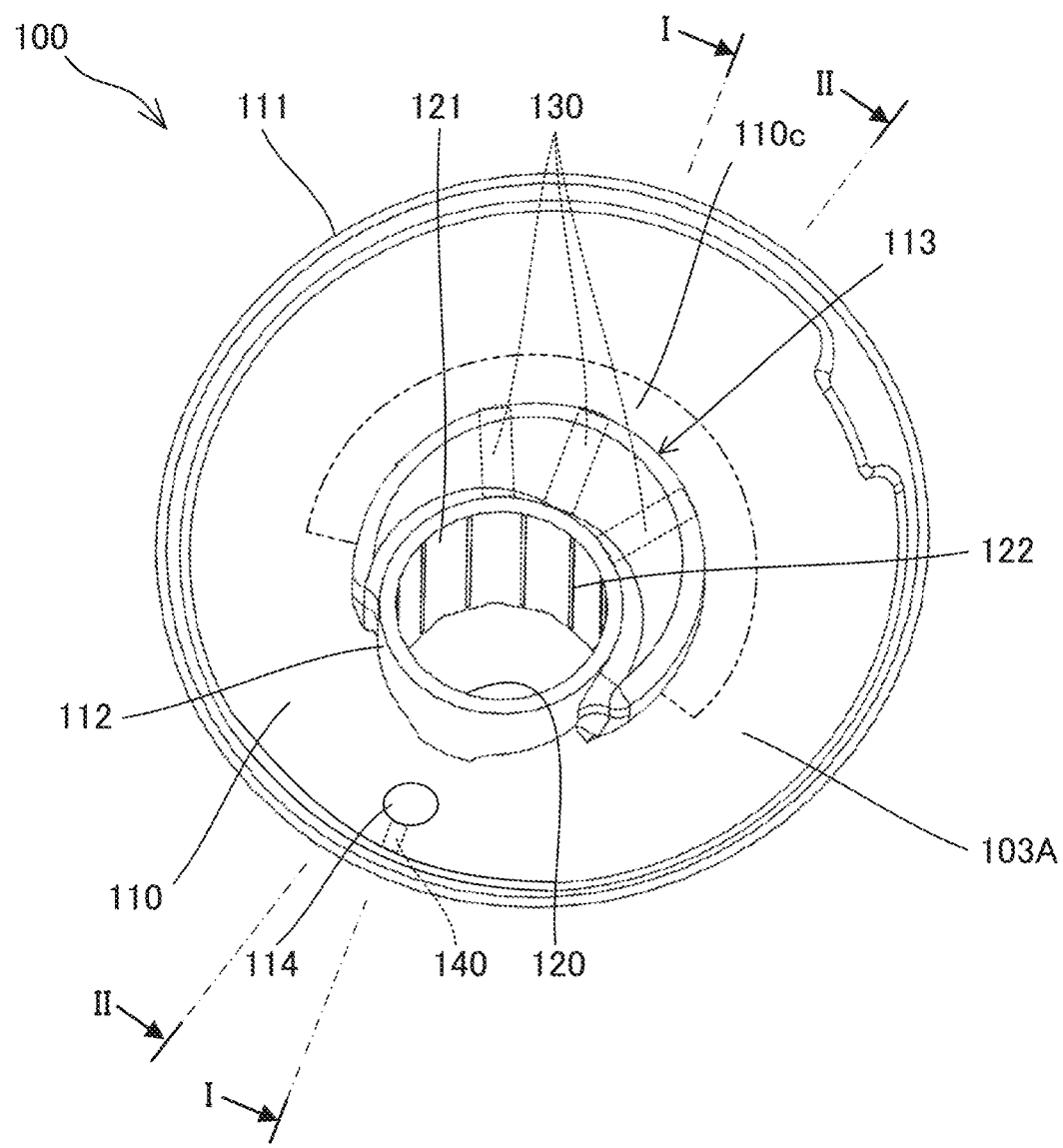
FIG. 2 is a perspective view of a spring guide according to the embodiment of the present invention.
Figure 3A:
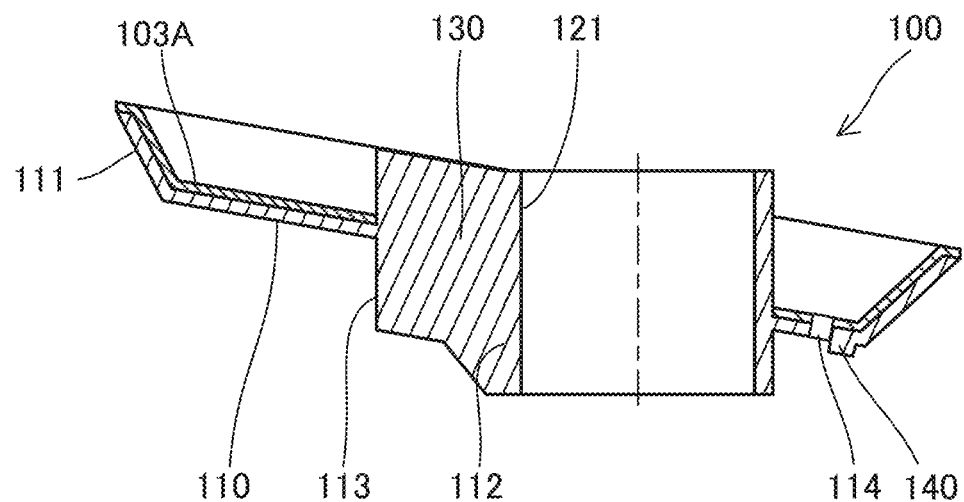
FIG. 3A is a side sectional view taken along a line I-I in FIG. 2.
Figure 3B:
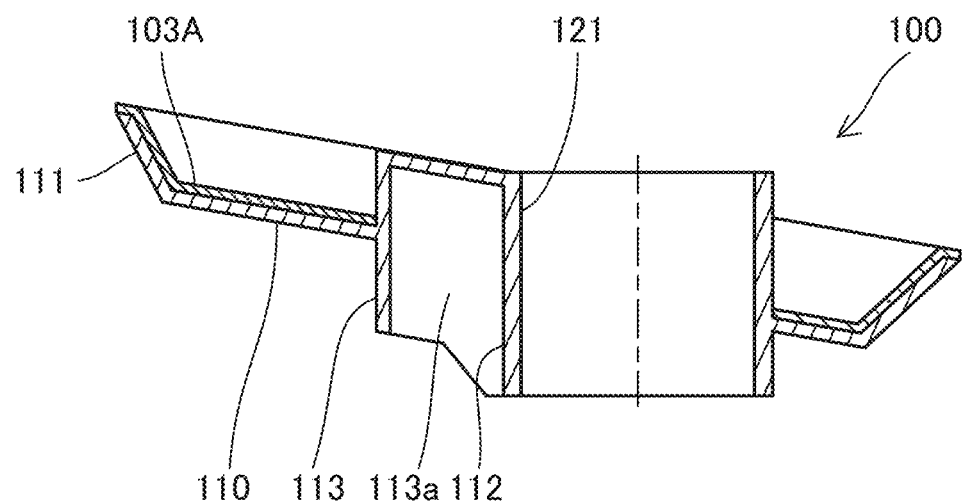
FIG. 3B is a side sectional view taken along a line II-II in FIG. 2.

FIG. 2 is a perspective view of the spring guide 100. In addition, FIG. 3A is a side sectional view taken along a line I-I in FIG. 2 and is a sectional view including first ribs 130, a drain hole 114, and a second rib 140, which will be described later. FIG. 3B is a side sectional view taken along a line II-II in FIG. 2 and is a sectional view that does not include the first ribs 130, the drain hole 114, and the second rib 140, which will be described later.

As shown in FIGS. 1 and 2, the spring guide 100 is a member that is attached to the outer circumference of the cylinder 1b to support the coil spring 4 from the lower side. The spring guide 100 is made of a fiber-reinforced resin. The fiber-reinforced resin is a material obtained by formulating reinforcing fibers, such as glass fibers and carbon fibers, with resin. As shown in FIGS. 1 to 3B, the spring guide 100 is provided with: a disc-shaped base portion 110 that supports the coil spring 4; a barrel portion 112 through which the cylinder 1b of the shock absorber 1 is inserted; the first ribs 130 that are formed so as to project out from an outer circumferential surface of the barrel portion 112; and a hub 113 serving as a guide portion that is formed so as to project out from a surface of the base portion 110, with its outer circumferential surface facing an inner circumference of the coil spring 4 to define the position of the coil spring 4.

The base portion 110 is formed so as to be inclined with respect to the plane perpendicular to the axial direction in a state in which the cylinder 1b of the shock absorber 1 is inserted through the barrel portion 112. FIG. 1 shows a state in which the base portion 110 is mounted on the suspension device 10 such that the wheel side is positioned at the upper side and the vehicle body side is positioned at the lower side. The base portion 110 supports a lower end portion of the coil spring 4 at a region 110c that is set around the hub 113 of the base portion 110. The base portion 110 has a side wall 111 that extends obliquely upward from a radially-outside end portion of the base portion 110. The side wall 111 has an annular shape and is inclined such that the inner diameter is increased as it extends upward from the base portion 110.

An elastic part 103A is provided on the surface of the base portion 110. With such a configuration, the base portion 110 of the spring guide 100 is prevented from coming into direct contact with the coil spring 4. In other words, the coil spring 4 is supported by the base portion 110 via the elastic part 103A. The elastic part 103A is made of a martial having a lower elastic modulus than the fiber-reinforced resin of the base portion 110, and for example, thermoplastic elastomers such as polyester elastomers, polyurethane elastomers, polyolefin elastomers, silicone elastomers, and so forth are employed. As the material of the elastic part 103A, thermosetting elastomers such as polyurethane rubber, silicone rubber, fluorocarbon rubber, and so forth, and other resin materials may be employed. In addition, the elastic part 103A may not be provided on the surface of the base portion 110.

The barrel portion 112 is formed in the base portion 110 and projects upward and downward from the base portion 110. The barrel portion 112 has an insertion hole 120 that penetrates through the base portion 110 in the axial direction and through which the cylinder 1b of the shock absorber 1 is inserted. As shown in FIG. 1, the barrel portion 112 is formed at a position eccentric from the center of the base portion 110 (in this embodiment, a position eccentric towards the vehicle body side).

As shown in FIG. 2, the barrel portion 112 is provided with protrusions 122 that protrude radially inward from an inner circumferential surface 121. The protrusions 122 support the outer circumferential surface of the cylinder 1b of the shock absorber 1. A plurality of protrusions 122 are arranged at equal intervals along the circumferential direction of the barrel portion 112 and are provided linearly along the axial direction of the barrel portion 112. The protrusions 122 are formed, for example, so as to each has a rounded trapezoidal or semicircular cross-sectional shape, and come into line contact with the outer circumferential surface of the cylinder 1b. Thus, the spring guide 100 is aligned such that the center axis of the barrel portion 112 coincides with the center axis of the cylinder 1b. The fitting between the cylinder 1b and the barrel portion 112, specifically, the fitting between the cylinder 1b and the protrusions 122 formed in the barrel portion 112 may be "a clearance fitting" or "an interference fitting". By employing "the interference fitting", rattling between the barrel portion 112 and the cylinder 1b is prevented, and so, it is possible to prevent generation of noise due to the rattling. In addition, it is also possible to improve responsibility of the operation of the suspension device 10.

As shown in FIG. 1, a metallic support ring 3 for supporting the spring guide 100 is fixed to the outer circumferential surface of the cylinder 1b by welding. The spring guide 100 is attached to the outer circumference of the cylinder 1b by supporting a lower end portion of the barrel portion 112 of the spring guide 100 by the support ring 3. In other words, the spring guide 100 is attached to the cylinder 1b by being fitted to the cylinder 1b from the above so as to come into contact with the support ring 3. The support ring 3 may also be fixed to the outer circumferential surface of the cylinder 1b by a method other than the welding, and for example, the support ring 3 may be fixed to the outer circumferential surface of the cylinder 1b by press-fitting the cylinder 1b into the support ring 3.

As shown in FIGS. 2 to 3B, the first ribs 130 have a rectangular shape and project downward from the back surface of the hub 113. A plurality of first ribs 130 are formed to extend radially from the outer circumferential surface of the barrel portion 112 so as to be spaced apart from each other in the circumferential direction of the barrel portion 112. The extension lines of the first ribs 130 intersect with the center axis of the barrel portion 112. By providing the first ribs 130, the strength of the hub 113 is improved, and at the same time, the strength of the barrel portion 112 is improved as described below.

The hub 113 is formed to be continuous with a part of the barrel portion 112 in the circumferential direction and projects upward from the base portion 110 at the inside of the coil spring 4. Specifically, the hub 113 is formed to be continuous with the barrel portion 112 on the center side of the base portion 110 and is formed to have a crescent shape extending between the base portion 110 and the barrel portion 112. The hub 113 may be formed so as to be continuous entirely with the barrel portion 112 in the circumferential direction. The hub 113 has an opening on the lower side, and a hollow space 113a is formed inside the hub 113. The first ribs 130 are formed so as to project into the hollow space 113a of the hub 113 from the back surface of the hub 113. An outer circumference of the hub 113 comes into contact with an inner circumference of the lower end portion of the coil spring 4 to define the position of the coil spring 4 in the radial direction. Because the lower end portion of the coil spring 4 is supported by the hub 113, an inclination (loss of perpendicularity) of the coil spring 4 is prevented.

As shown in FIGS. 1, 2, and 3A, the spring guide 100 is further provided with the drain hole 114 that is formed in the base portion 110 to discharge liquid accumulated in the base portion 110 and the second rib 140 that is formed on the base portion 110 so as to be continuous with the drain hole 114.

In this embodiment, the drain hole 114 is on the vehicle body side of the base portion 110. With such a configuration, the drain hole 114 is formed on the lower side in the base portion 110, and so, the liquid accumulated in the base portion 110 is discharged from the drain hole 114 efficiently. The second rib 140 has a rectangular shape and is formed so as to project out from a back surface of the base portion 110. The second rib 140 is formed so as to extend in the radial direction of the drain hole 114. Furthermore, the second rib 140 is formed such that the center axis of the drain hole 114 is positioned between the second rib 140 and the center axis of the barrel portion 112. By providing the second rib 140, the strength of the base portion 110 is improved as described below. The second rib 140 may also be formed so as to project out from the surface of the base portion 110.

Next, a method of manufacturing of the spring guide 100 will be described with reference to FIGS. 4A to 5B.

Figure 4A:
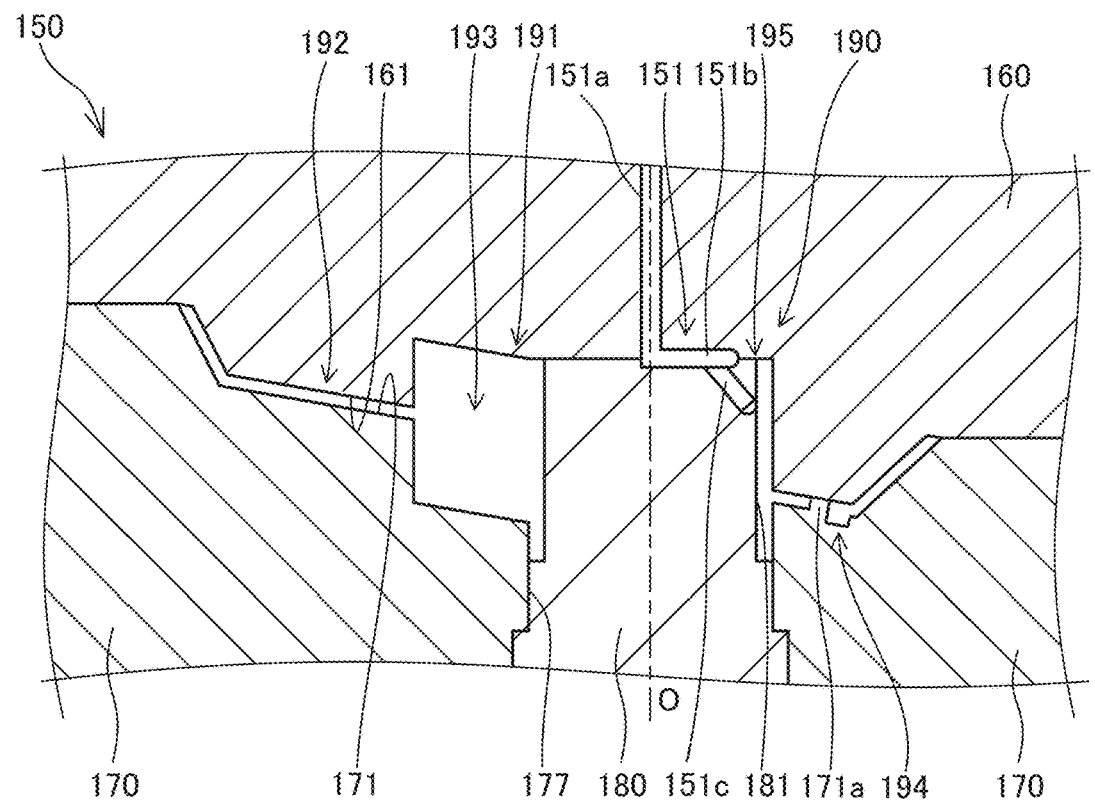
FIG. 4A is a schematic view, corresponding to FIG. 3A, of a cross-section of a mold.
Figure 4B:
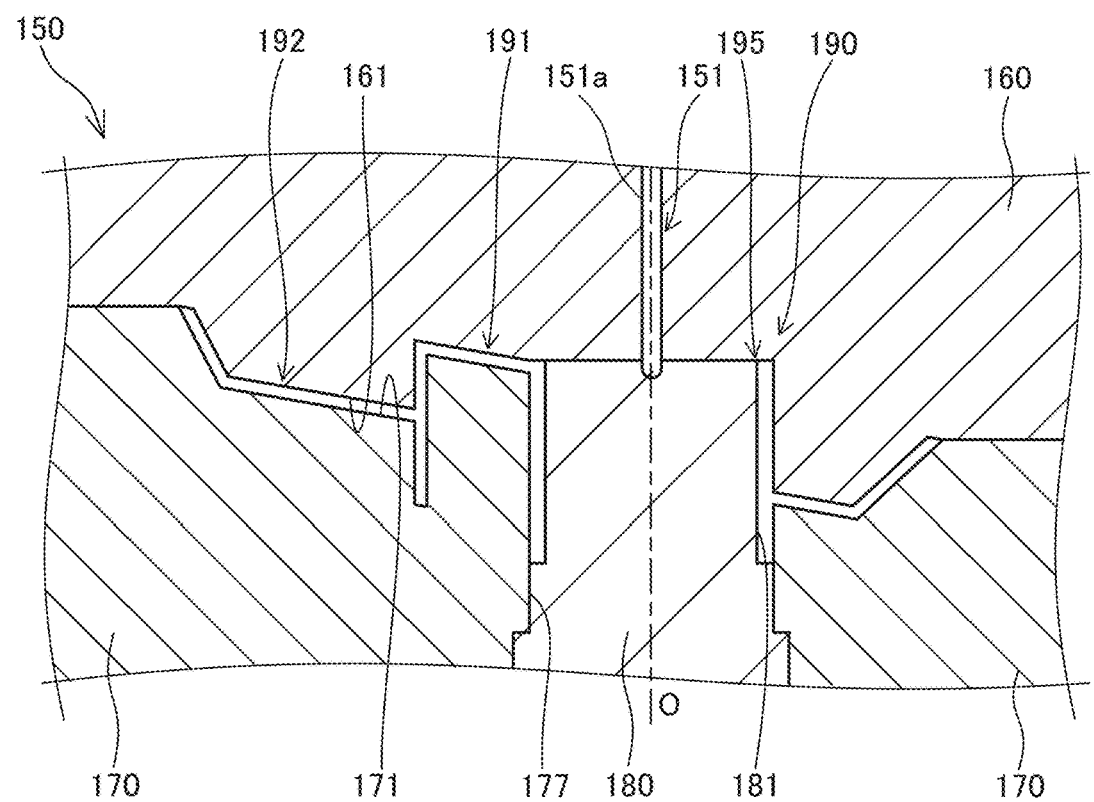
FIG. 4B is a schematic view, corresponding to FIG. 3B, of a cross-section of the mold.

In this embodiment, the spring guide 100 is integrally molded by injection molding using a submarine gate 151c as a gate. FIGS. 4A and 4B are each a schematic view of a cross-section of a mold 150 serving as a mold for the injection molding used for performing the injection molding and show a state in which alignment has been achieved for the mold 150 for the molding of the spring guide 100. FIG. 4A corresponds to the sectional view shown in FIG. 3A, and FIG. 4B corresponds to the sectional view shown in FIG. 3B.

The mold 150 has: a first mold 160 for molding the front side of the base portion 110 of the spring guide 100; a second mold 170 for molding a back surface side of the base portion 110 of the spring guide 100; and a third mold 180 that is inserted into the second mold 170 to mold the barrel portion 112. The second mold 170 is formed with a hole 177 having a circular cylinder shape. The third mold 180 has a circular cylinder shape and is inserted into a hole 177 of the second mold 170. As shown in FIGS. 4A and 4B, for the mold 150, the first mold 160 is aligned so as to face the second mold 170 and the third mold 180. The spring guide 100 is molded by injecting the fiber-reinforced resin into an interior of the mold 150 from the submarine gate 151c in a state in which the alignment has been achieved for the mold 150.

The first mold 160 is formed with a molding surface 161 for molding the front side of the base portion 110 of the spring guide 100. The molding surface 161 is formed so as to correspond to the shape of the front side of the base portion 110 of the spring guide 100. The second mold 170 is formed with a molding surface 171 for molding the back surface side of the base portion 110 of the spring guide 100. The molding surface 171 is formed so as to mold a region on the outer side of the barrel portion 112 on the back surface side of the base portion 110 of the spring guide 100. The molding surface 171 is formed so as to correspond to the shape of a back surface side of the spring guide 100, and the molding surface 171 is formed with a protrusion 171a having a circular cylinder shape corresponding to the drain hole 114 (see FIG. 4A). The third mold 180 is formed with an annular molding surface 181 for molding the barrel portion 112. The molding surface 181 is formed so as to correspond to the shape of the inner circumferential surface 121 of the barrel portion 112 and the shape of the lower end of the barrel portion 112.

As shown in FIGS. 4A and 4B, in a state in which the alignment has been achieved for the mold 150, a molding region 190 for molding the spring guide 100 is formed between the molding surface 161 of the first mold 160, the molding surface 171 of the second mold 170, and the molding surface 181 of the third mold 180. The molding region 190 has following respective regions. A base-portion molding region 192 corresponding to the base portion 110 and the side wall 111 and a hub molding region 191 corresponding to the hub 113 are formed between the molding surface 161 of the first mold 160 and the molding surface 171 of the second mold 170. First-rib molding regions 193 corresponding to the first ribs 130 (see FIG. 4A) and a second-rib molding region 194 corresponding to the second rib 140 (see FIG. 4A) are formed on the molding surface 171 of the second mold 170. A barrel-portion molding region 195 corresponding to the barrel portion 112 is formed between the molding surface 181 of the third mold 180, the molding surface 161 of the first mold 160, and the molding surface 171 of the second mold 170.

In addition, the mold 150 is formed with an injection channel 151 for injecting the fiber-reinforced resin to the molding region 190. The injection channel 151 has: a sprue 151a that is formed in the first mold 160 so as to extend linearly along the center axis O of the barrel-portion molding region 195; a runner 151b that is formed in the first mold 160 and the third mold 180 so as to extend linearly radially outward by being bent by 90 degree from an end portion of the sprue 151a; and the submarine gate 151c that is formed in the third mold 180 such that the runner 151b and the barrel-portion molding region 195 are communicated. In this embodiment, there is only one submarine gate 151c. The submarine gate 151c is formed such that the center axis O of the barrel-portion molding region 195 is positioned between the submarine gate 151c and one of a plurality of first-rib molding regions 193 in a state in which the alignment has been achieved for the mold 150. Furthermore, the submarine gate 151c is formed such that the center axis of a protrusion 171a on the molding surface 171 of the second mold 170 is positioned between the submarine gate 151c and the second-rib molding region 194.

The method of manufacturing the spring guide 100 includes a mold aligning step, a molding step, and a mold separating step. As shown in FIGS. 4A and 4B, in the mold aligning step, the first mold 160, the second mold 170, and the third mold 180 are aligned to form the molding region 190 into which the fiber-reinforced resin is to be filled. When the mold aligning step is completed, the molding step is performed.

Figure 6:
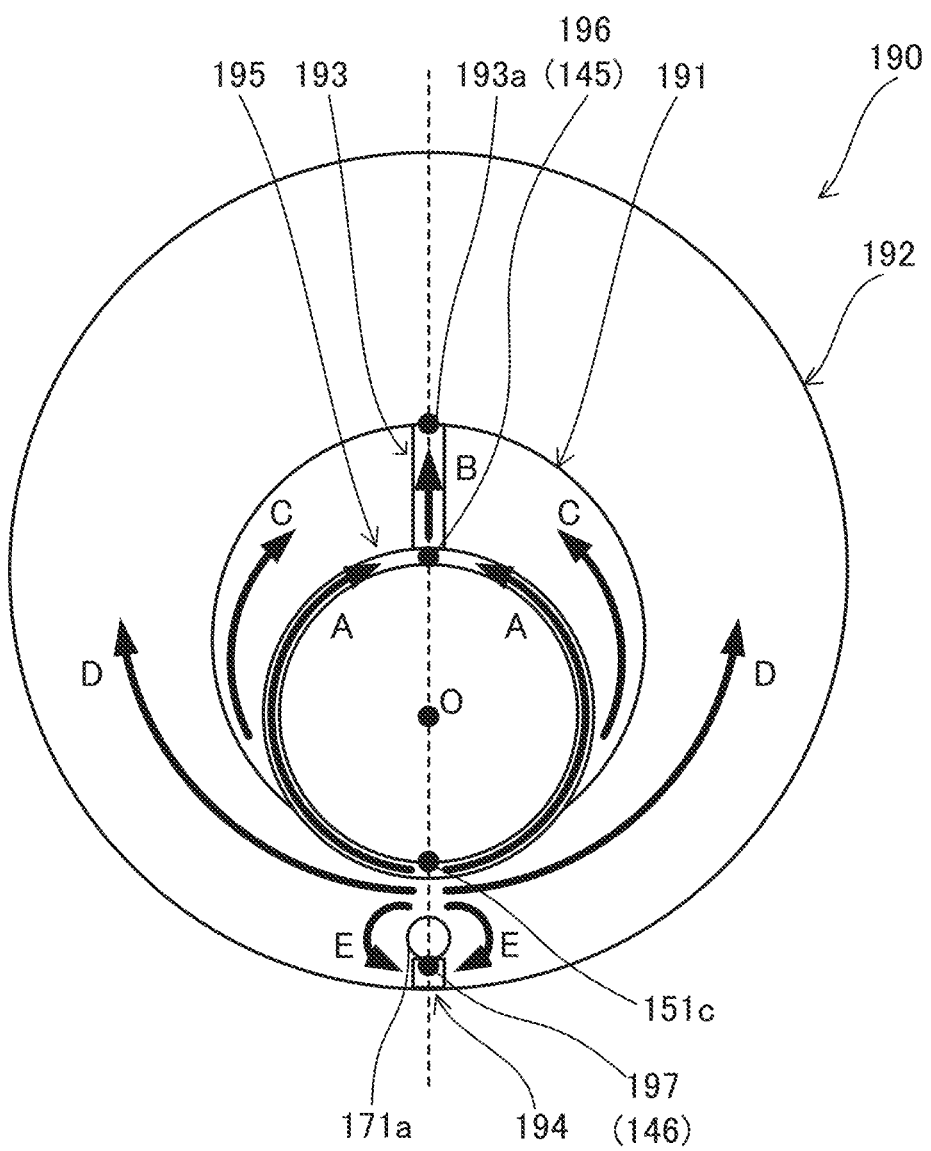
FIG. 6 is a schematic plan view showing flows of the fiber-reinforced resin in a molding step.

FIG. 6 is a schematic plan view showing flows of the fiber-reinforced resin in the molding region 190 in the molding step. In FIG. 6, only one of the first-rib molding regions 193, which is formed such that the center axis O of the barrel-portion molding region 195 is positioned between the first-rib molding region 193 and the submarine gate 151c, is illustrated representatively. In addition, also in the following description of the molding step, for the first-rib molding regions 193, the one that is formed such that the center axis O of the barrel-portion molding region 195 is positioned between it and the submarine gate 151c will be described as a representative example.

Figure 5A:
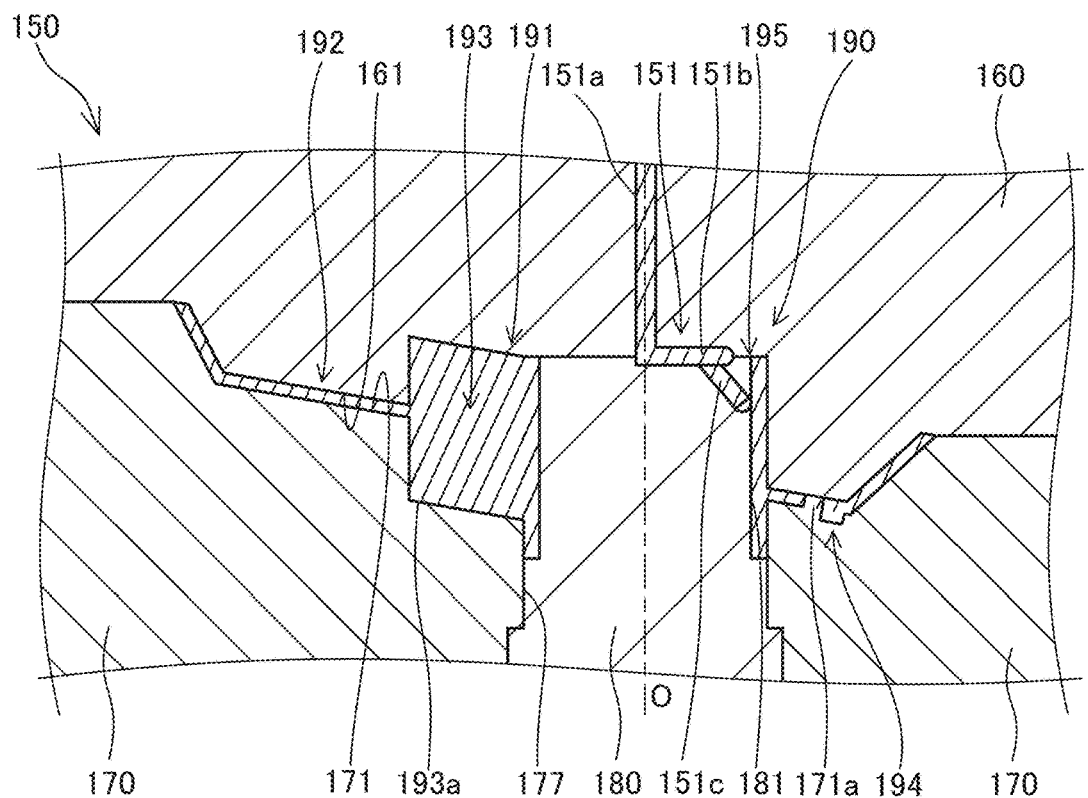
FIG. 5A is a schematic view, corresponding to FIG. 4A, of a cross-section of the mold, into which a fiber-reinforced resin has been injected.
Figure 5B:
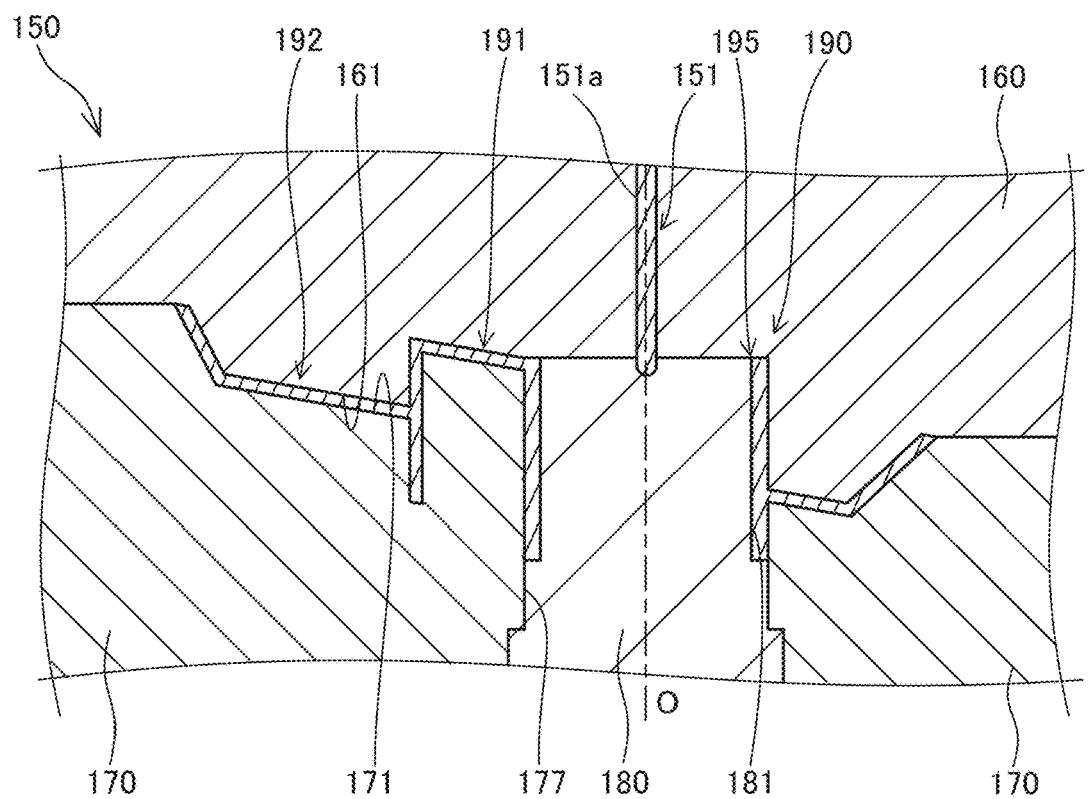
FIG. 5B is a schematic view, corresponding to FIG. 4B, of a cross-section of the mold, into which the fiber-reinforced resin has been injected.

As shown in FIGS. 5A to 6, in the molding step, the molten fiber-reinforced resin is injected into the molding region 190 in the mold 150 through the sprue 151a, the runner 151b, and the submarine gate 151c to fill the fiber-reinforced resin into an interior of the molding region 190. Because the submarine gate 151c communicates with the barrel-portion molding region 195, in the molding step, the fiber-reinforced resin will be injected from the submarine gate 151c into an interior of the barrel-portion molding region 195 in the circumferential direction of the barrel portion 112.

The flows of the fiber-reinforced resin injected from the submarine gate 151c into the interior of the barrel-portion molding region 195 in the molding step will be described in detail. As indicated by arrows A in FIG. 6, the fiber-reinforced resin that has been injected from the submarine gate 151c into the interior of the barrel-portion molding region 195 flows in the interior of the barrel-portion molding region 195 by being divided into two circumferential directions. The flows of the fiber-reinforced resin flowing in two directions in the interior of the barrel-portion molding region 195 join at a first joining position 196 in the interior of the barrel-portion molding region 195. Specifically, the first joining position 196 is a location where the center axis O of the barrel-portion molding region 195 is positioned between the first joining position 196 and the submarine gate 151c in the interior of the barrel-portion molding region 195. At the first joining position 196, a first weld portion 145 (see FIG. 6), which is a boundary face, is formed as the flows of the fiber-reinforced resin flowing in the two directions are joined when the barrel portion 112 is formed. The first weld portion 145 is formed on the inner circumference of the barrel portion 112. As described above, the barrel portion 112 is formed by the fiber-reinforced resin flowing in the interior of the barrel-portion molding region 195 by being divided into two circumferential directions. Thus, in the barrel portion 112, the fiber-reinforced resin is oriented in the circumferential direction.

The first-rib molding region 193 is formed such that the center axis O of the barrel-portion molding region 195 is positioned between the first-rib molding region 193 and the submarine gate 151c. In other words, the first-rib molding region 193 communicates with the first joining position 196. Thus, as indicated by an arrow B in FIG. 6, the two flows of the fiber-reinforced resin that have been joined at the first joining position 196 respectively flow into an interior of the first-rib molding region 193. The fiber-reinforced resin that has flown into the interior of the first-rib molding region 193 fills the interior of the first-rib molding region 193. As described above, the first rib 130 is formed by two flows of the fiber-reinforced resin. In other words, in the molding step, the first rib 130 is molded such that the first rib 130, the submarine gate 151c solely provided in the mold, and the center axis O of the barrel portion 112 are positioned in a straight line. The first rib 130 is formed so as to project out from the first weld portion 145 towards the outer circumference of the spring guide 100.

In addition, the barrel-portion molding region 195 also communicates with the hub molding region 191. Thus, as indicated by arrows C in FIG. 6, the fiber-reinforced resin in the interior of the barrel-portion molding region 195 also flows into an interior of the hub molding region 191. The fiber-reinforced resin that has flown into the interior of the hub molding region 191 flows in the interior of the hub molding region 191 so as to mainly follow the circumferential direction of the hub molding region 191 and fills the interior of the hub molding region 191. In addition, the fiber-reinforced resin flows into the interior of the hub molding region 191 also from the first joining position 196 in the barrel-portion molding region 195. Specifically, the fiber-reinforced resin flows into the interior of the hub molding region 191 from an upper end of the first joining position 196 and fills the interior of the hub molding region 191. Furthermore, the fiber-reinforced resin flows into the interior of the hub molding region 191 also from the interior of the first-rib molding region 193 and fills the interior of the hub molding region 191. As described above, the hub 113 is formed. The hub 113 is formed so as to be continuous with the first weld portion 145.

In addition, the barrel-portion molding region 195 communicates with the base-portion molding region 192. Thus, the fiber-reinforced resin in the interior of the barrel-portion molding region 195 also flows into an interior of the base-portion molding region 192. Furthermore, the base-portion molding region 192 also communicates with the hub molding region 191. Thus, the fiber-reinforced resin in the interior of the hub molding region 191 also flows into the interior of the base-portion molding region 192. For the fiber-reinforced resin that has flown into the interior of the base-portion molding region 192, there are flows of the fiber-reinforced resin that flow along the circumferential direction of the base-portion molding region 192, as indicated by arrows D in FIG. 6, and flows of the fiber-reinforced resin that flow along the circumferential direction of the protrusion 171a of the molding surface 171 of the second mold 170, as indicated by arrows E in FIG. 6.

The fiber-reinforced resin flowing along the circumferential direction of the base-portion molding region 192 fills the interior of the base-portion molding region 192. As indicated by the arrows E in FIG. 6, the fiber-reinforced resin flowing along the circumferential direction of the protrusion 171a flows by being divided into two circumferential directions around the protrusion 171a and fills the interior of the base-portion molding region 192. As a result, the base portion 110 and the side wall 111 are molded. The flows of the fiber-reinforced resin flowing around the protrusion 171a by being divided into two circumferential directions join at a second joining position 197 in the base-portion molding region 192. Specifically, the second joining position 197 is a location where the center axis of the protrusion 171a is positioned between the second joining position 197 and the submarine gate 151c on an outer circumference of the protrusion 171a. At the second joining position 197, a second weld portion 146 (see FIG. 6), which is the boundary face, is formed as the flows of the fiber-reinforced resin flowing in the two directions are joined when the drain hole 114 is formed. The second weld portion 146 is formed on an inner circumference of the drain hole 114.

In the above, the second-rib molding region 194 is formed such that the center axis of the protrusion 171a is positioned between the second-rib molding region 194 and the submarine gate 151c. In other words, the second-rib molding region 194 is formed by extending from the second joining position 197. Thus, the two flows of the fiber-reinforced resin indicated by the arrows E in FIG. 6 join and respectively flow into an interior of the second-rib molding region 194, thereby filling the interior of the second-rib molding region 194. As described above, the second rib 140 is molded by the two flows of the fiber-reinforced resin. The second rib 140 is formed so as to project out from the second weld portion 146 towards the outer circumference of the spring guide 100.

As described above, the interior of the molding region 190 is filled with the fiber-reinforced resin. It should be noted that the directions of the flows of the fiber-reinforced resin described above do not necessarily mean that all of the flows of the fiber-reinforced resin flow in the above-described directions in the respective regions. In addition, the term "the circumferential direction" does not indicate the strict direction of the flow of the fiber-reinforced resin, and the fiber-reinforced resin may locally flow in the directions other than the circumferential direction. For example, in the interior of the barrel-portion molding region 195, although the fiber-reinforced resin does not flow strictly in the circumferential direction around the submarine gate 151c and at the first weld portion 145, the fiber-reinforced resin flows in the circumferential direction as a whole in the interior of the barrel-portion molding region 195. When the filling of the fiber-reinforced resin in the interior of the molding region 190 is completed, the heat of the mold 150 is removed to cool and harden the fiber-reinforced resin. As a result, the molding step is completed. When the molding step is completed, the mold separating step is performed.

In the mold separating step, the first mold 160, or the second mold 170 and the third mold 180 is/are moved such that the first mold 160 is separated from the second mold 170 and the third mold 180. As a result, the submarine gate 151c having a smaller cross-sectional area than the runner 151b is cut off. As the submarine gate 151c is cut off, a gate cut mark, which is a remaining of the submarine gate 151c, is formed on the inner circumferential surface 121 of the barrel portion 112. The submarine gate 151c need not be cut off by the separation of the mold 150, but the submarine gate 151c may be cut off by using a tool such as a nipper. Also in this case, the gate cut mark is formed on the inner circumferential surface 121 of the barrel portion 112. The third mold 180 is then removed from the hole 177 of the second mold 170, and the spring guide 100 is separated from the mold 150 by using an injector pin (not shown). Then, the mold separating step is completed, and the spring guide 100 is finished.

When the cylinder 1b of the shock absorber 1 is inserted through the barrel portion 112 of the finished spring guide 100, a radial load acts on the barrel portion 112. In the spring guide 100 of this embodiment, in the barrel portion 112, the reinforcing fibers of the fiber-reinforced resin are oriented in the circumferential direction. Specifically, in the method of manufacturing the spring guide 100 of this embodiment, in the molding step, the fiber-reinforced resin is injected from the submarine gate 151c into the interior of the barrel-portion molding region 195 in the circumferential direction of the barrel portion 112. Therefore, the direction of the load acting on the barrel portion 112 when the cylinder 1b is inserted through the barrel portion 112 is orthogonal to the orientation direction of the reinforcing fibers. Thus, the load acting on the barrel portion 112 when the cylinder 1b is inserted through the barrel portion 112 can be received by both of the resin and the reinforcing fibers contained in the fiber-reinforced resin. Consequently, it is possible to improve the strength of the barrel portion 112.

In addition, in general, in the injection molding, if a plurality of flows of a material in a mold are joined and a weld, which is the boundary face, is formed, the strength of the part where the weld is formed becomes lower than that of other parts. In this embodiment, in the molding step, the first weld portion 145 and the second weld portion 146 are formed at the first joining position 196 and the second joining position 197, respectively.

Here, in the molding step, the first rib 130 is formed by guiding the fiber-reinforced resin from the first joining position 196. In other words, the first rib 130 is formed so as to project out from the first weld portion 145 towards the outer circumference of the spring guide 100. In other words, the first rib 130 is formed by guiding the fiber-reinforced resin, the flows of which have been joined when the barrel portion 112 is formed. As a result, the portion of the fiber-reinforced resin that has formed the weld at the first joining position 196 does not remain in the interior of the barrel-portion molding region 195 and flows into the interior of the first-rib molding region 193. The fiber-reinforced resin that has flown into the interior of the first-rib molding region 193 is directed to a corner portion 193a of the first-rib molding region 193 (more precisely, a part of the hub molding region 191 adjacent to the corner portion 193a). In other words, the portion of the fiber-reinforced resin that has formed the weld at the first joining position 196 is guided to the corner portion 193a. Thus, it is possible to reduce the size of the weld (the first weld portion 145) that is formed on the barrel portion 112 at the time of the injection molding. Thus, it is possible to improve the strength of the barrel portion 112.

In addition, in this embodiment, as described above, because the portion of the fiber-reinforced resin that has formed the weld is guided to the corner portion 193a in the first-rib molding region 193, the size of the first weld portion 145 formed on the barrel portion 112 is made smaller. However, the strength of the first weld portion 145 tends to be lower on the barrel portion 112. However, in the molding step, the hub 113 is molded by guiding the fiber-reinforced resin from the first joining position 196 in the barrel-portion molding region 195. In other words, the hub 113 is molded continuously with the first weld portion 145. Thus, the barrel portion 112 is reinforced by the hub 113, and thereby, it is possible to improve the strength of the barrel portion 112.

In addition, the second-rib molding region 194 is formed such that the center axis of the protrusion 171a of the molding surface 171 of the second mold 170 is positioned between the second-rib molding region 194 and the submarine gate 151c. In the molding step, the flows of the fiber-reinforced resin flowing by being divided into two circumferential directions of the protrusion 171a join at the second joining position 197 and respectively flow into the interior of the second-rib molding region 194 to fill the interior of the second-rib molding region 194. In other words, the second rib 140 is molded such that the center axis of the drain hole 114 is positioned between the second rib 140 and the submarine gate 151c. In other words, the second rib 140 is formed so as to project out from the second weld portion 146 towards the outer circumference of the spring guide 100. In other words, the second rib 140 is formed by guiding the fiber-reinforced resin, the flows of which have been joined when the drain hole 114 is formed. As a result, even with the spring guide 100 in which the base portion 110 has the drain hole 114, it is possible to reduce the size of the weld (the second weld portion 146) formed on the base portion 110 at the time of the injection molding. Thus, it is possible to improve the strength of the base portion 110.

In addition, because the first rib 130 and the second rib 140 project in the axial direction from the base portion 110, they have the effect of reinforcing the base portion 110 against the force applied in the axial direction. Thus, by molding the first rib 130 and the second rib 140 as described above in the molding step, it is possible to improve the strength of the barrel portion 112 and the base portion 110.

In addition, in the molding step, the gate cut mark, which is a remaining of the submarine gate 151c, is formed. Compared with a case in which other gates, such as a disc gate, etc., are used, the gate cut mark in this embodiment has a smaller cross-sectional area, and therefore, absorption of water, etc. from the gate cut mark into the fiber-reinforced resin is suppressed. Thus, deterioration of the spring guide 100 is suppressed.

The spring guide 100 may only have either one of the first rib 130 and the hub 113 and may not have both of the first rib 130 and the hub 113. In other words, in the molding step, it is not essential to mold the first rib 130 and the hub 113, and it suffices to inject the fiber-reinforced resin from the submarine gate 151c into the interior of the barrel-portion molding region 195 in the circumferential direction of the barrel portion 112. However, because the size of the first weld portion 145 formed on the barrel portion 112 tends to be large in this case, in the molding step, it is preferable to mold at least the first rib 130. By molding the first rib 130, the portion of the fiber-reinforced resin that has formed the weld at the first joining position 196 is guided to the corner portion 193a of the first-rib molding region 193. Thus, it is possible to reduce the size of the first weld portion 145 that is formed on the barrel portion 112 at the time of the injection molding. In addition, when the first rib 130 is to be molded, it is possible to mold the first rib 130 with ease by molding the first rib 130 so as to project out from the back surface of the hub 113 by utilizing the hub 113 for defining the position of the coil spring 4.

In addition, the spring guide 100 may not have the drain hole 114 and the second rib 140 and may not have both of the drain hole 114 and the second rib 140. In other words, in the molding step, it is not essential to mold the drain hole 114 and the second rib 140. However, if the drain hole 114 is to be molded on the spring guide 100, in order to position the weld on the second rib 140, it is preferable to mold it together with the second rib 140.

In addition, the first rib 130 may not be formed directly on the line of the first weld portion 145, and it may be formed so as to project out from a part of the first weld portion 145. In addition, the second rib 140 may also not be formed directly on the line of the second weld portion 146, and it may be formed so as to project out from a part of the second weld portion 146.

In addition, the method for injection molding the spring guide 100 is not limited to that using the submarine gate 151c, and the spring guide 100 may be injection molded by using a tunnel gate, a pin gate, and so forth.

According to the above-described embodiment, following operational advantages are afforded.

In the molding step, because the fiber-reinforced resin is injected from the submarine gate 151c into the interior of the barrel-portion molding region 195 in the circumferential direction of the barrel portion 112, the reinforcing fibers of the fiber-reinforced resin are oriented in the circumferential direction in the barrel portion 112. Thus, the direction of the load acting on the barrel portion 112 when the cylinder 1b is inserted through the barrel portion 112 is orthogonal to the orientation direction of the reinforcing fibers, and therefore, it is possible to improve the strength of the barrel portion 112.

In the molding step, the first rib 130 is molded by guiding the fiber-reinforced resin from the first joining position 196. Thus, it is possible to reduce the size of the first weld portion 145 that is formed on the barrel portion 112 at the time of the injection molding, and so, it is possible to improve the strength of the barrel portion 112.

In the molding step, the hub 113 is molded by guiding the fiber-reinforced resin from the first joining position 196. In other words, the hub 113 is molded so as to be continuous with a portion of the barrel portion 112 whose strength tends to be lowered at the time of the injection molding. Thus, by molding the hub 113, it is possible to improve the strength of the barrel portion 112.

In the molding step, the second rib 140 is molded such that the center axis of the drain hole 114 is positioned between the second rib 140 and the submarine gate 151c. As a result, even with the spring guide 100 in which the base portion 110 has the drain hole 114, it is possible to allow the weld formed at the time of the injection molding to be positioned within the second rib 140. Thus, it is possible to improve the strength of the base portion 110.

Next, modifications of this embodiment will be described.
<Modification 1>

Figure 7:
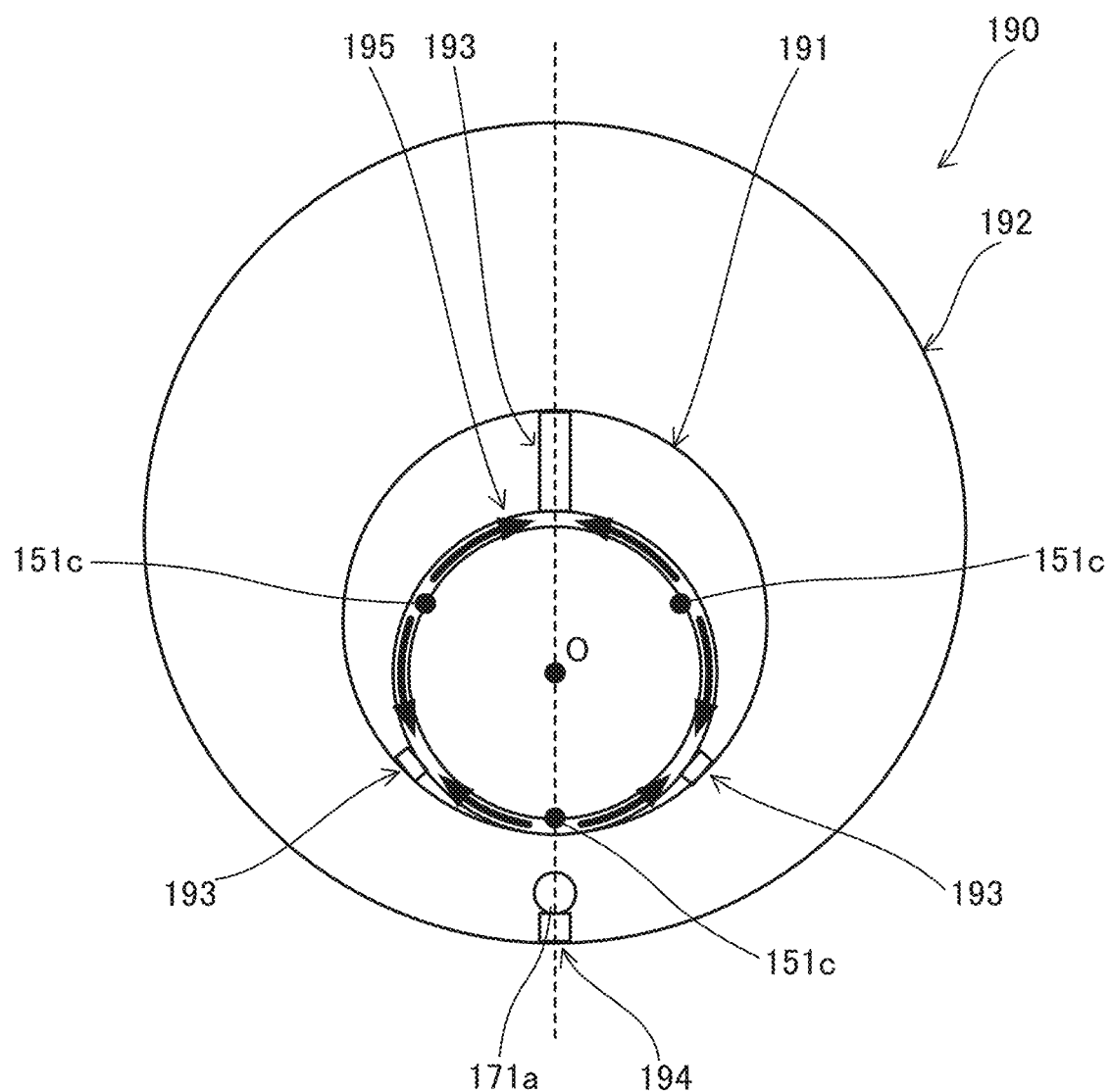
FIG. 7 is a schematic plan view, corresponding to FIG. 6, showing a position of a submarine gate in a modification of the embodiment of the present invention.

In the above-mentioned embodiment, a description is given of a case in which, in the molding step, the fiber-reinforced resin is injected into the interior of the barrel-portion molding region 195 from the submarine gate 151c solely provided in the mold 150. The method of injecting the fiber-reinforced resin in the molding step is not limited thereto. For example, as shown in FIG. 7, the fiber-reinforced resin may be injected into the interior of the barrel-portion molding region 195 from a plurality of submarine gates 151c provided in the mold 150. In other words, in the molding step, it suffices to inject the fiber-reinforced resin into the circumferential direction of the barrel portion 112 from at least one part of the barrel-portion molding region 195. FIG. 7 shows a case in which three submarine gates 151c are provided at intervals of 120 degrees. Even with this configuration, similarly to this embodiment, because the reinforcing fibers of the fiber-reinforced resin are oriented in the circumferential direction in the barrel portion 112, it is possible to improve the strength of the barrel portion 112. When the fiber-reinforced resin is injected from the plurality of submarine gates 151c, as indicated be arrows in FIG. 7, the first rib 130 may be formed by guiding the fiber-reinforced resin into the first-rib molding region 193 from positions at which the flows from the adjacent submarine gates 151c join. Specifically, a plurality of submarine gates 151c may be formed in the third mold 180 such that the first-rib molding region 193 is positioned at the midpoint between the submarine gates 151c that are adjacent to each other in the circumferential direction.

In addition, the submarine gate 151c may be provided in the interior of the base-portion molding region 192, and the fiber-reinforced resin may be injected into the interior of the base-portion molding region 192 from the submarine gate 151c. Also in this case, the fiber-reinforced resin flows in the interior of the barrel-portion molding region 195 by being divided into two circumferential directions, and in the barrel portion 112, the fiber-reinforced resin is oriented in the circumferential direction. In other words, it suffices that the method of manufacturing the spring guide 100 has the molding step in which the fiber-reinforced resin is injected so as to flow in the circumferential direction of the barrel portion 112.
<Modification 2>

In the above-mentioned embodiment, the first rib 130 and the second rib 140 each has the rectangular shape. The configuration is not limited thereto, and the first rib 130 and the second rib 140 may have, for example, a triangular shape that protrudes downwards or horizontally in the cross-section shown in FIG. 3A. Also in this configuration, similarly to this embodiment, it is possible to allow the weld formed at the time of the injection molding to be positioned in the first rib 130 and the second rib 140. In addition, it suffices that the first rib 130 and the second rib 140 are configured by being formed so as to project out from the first weld portion 145 and the second weld portion 146, respectively, towards the outer circumference of the spring guide 100. For example, the first rib 130 may be formed so as to extend in the direction different from the radial direction of the barrel portion 112, and the second rib 140 may be formed so as to extend in the direction different from the radial direction of the drain hole 114.

The configurations, operations, and effects of the embodiments of the present invention configured as described above will be collectively described.

The spring guide 100 made of the fiber-reinforced resin includes: the disc-shaped base portion 110 configured to support the coil spring 4, the coil spring 4 being configured to elastically support the vehicle body; and the barrel portion 112 through which the cylinder 1b of the shock absorber 1 is inserted, wherein in the barrel portion 112, the fiber-reinforced resin is oriented in the circumferential direction.

In this configuration, in the barrel portion 112, the reinforcing fibers of the fiber-reinforced resin are oriented in the circumferential direction. Therefore, when the cylinder 1b is to be inserted through the barrel portion 112, the direction of the load acting on the barrel portion 112 is orthogonal to the orientation direction of the reinforcing fibers. Thus, it is possible to improve the strength of the barrel portion 112.

The spring guide 100 further includes the first rib 130 formed so as to project out towards the outer circumference of the spring guide 100 from the first weld portion 145 formed on the inner circumference of the barrel portion 112.

In this configuration, the first rib 130 is formed so as to project out from the first weld portion 145 towards the outer circumference of the spring guide 100. In other words, the first rib 130 is formed by guiding the fiber-reinforced resin, the flows of which have been joined when the barrel portion 112 is formed. Thus, because the size of the first weld portion 145 formed on the barrel portion 112 at the time of the injection molding can be reduced, it is possible to improve the strength of the barrel portion 112.

The spring guide 100 further includes the hub 113 serving as the guide portion that is formed so as to project out from the surface of the base portion 110, the hub 113 being configured such that the outer circumferential surface of the hub 113 faces the inner circumference of the coil spring 4 and defines the position of the coil spring 4, and the hub 113 is formed so as to be continuous with the first weld portion 145 formed on the inner circumference of the barrel portion 112.

In this configuration, the hub 113 that defines the position of the coil spring 4 is formed so as to be continuous with the first weld portion 145. Although the first weld portion 145 tends to have lower strength in the barrel portion 112, because the first weld portion 145 is reinforced by the hub 113, it is possible to improve the strength of the barrel portion 112.

The spring guide 100 is further includes: the drain hole 114 formed in the base portion 110, the drain hole 114 being configured to discharge the liquid accumulated in the base portion 110; and the second rib 140 formed so as to project out towards the outer circumference of the spring guide 100 from the second weld portion 146 formed on the inner circumference of the drain hole 114.

In this configuration, the second rib 140 is formed so as to project out from the second weld portion 146 towards the outer circumference of the spring guide 100. In other words, the second rib 140 is formed by guiding the fiber-reinforced resin, the flows of which have been joined when the drain hole 114 is formed. Thus, even with the spring guide 100 in which the base portion 110 has the drain hole 114, because the size of the second weld portion 146 formed on the base portion 110 at the time of the injection molding can be reduced, it is possible to improve the strength of the base portion 110.

The method of manufacturing the spring guide 100 made of the fiber-reinforced resin, which includes: the disc-shaped base portion 110 configured to support the coil spring 4, the coil spring 4 being configured to elastically support the vehicle body; and the barrel portion 112 through which the cylinder 1b of the shock absorber 1 is inserted, has the molding step of injecting the fiber-reinforced resin into the mold 150 serving as the mold for injection molding so as to flow in the circumferential direction of the barrel portion 112.

In this configuration, in the barrel portion 112, the reinforcing fibers of the fiber-reinforced resin are oriented in the circumferential direction. Therefore, when the cylinder 1b is inserted through the barrel portion 112, the direction of the load acting on the barrel portion 112 is orthogonal to the orientation direction of the reinforcing fibers. Thus, it is possible to improve the strength of the barrel portion 112.

The spring guide 100 further includes the first rib 130 formed so as to project out from the outer circumferential surface of the barrel portion 112, and in the molding step, the first rib 130 is molded by injecting the fiber-reinforced resin from the submarine gate 151c serving as the gate provided in the barrel-portion molding region 195 and by guiding the fiber-reinforced resin from the first joining position 196 where the flows of the fiber-reinforced resin join in the barrel-portion molding region 195.

The method of manufacturing the spring guide 100 is provided, and the spring guide 100 further includes the first rib 130 formed so as to project out towards the outer circumference of the spring guide 100 from the first weld portion 145 that is formed as the flows of the fiber-reinforced resin join when the barrel portion 112 is formed, and in the molding step, the first rib 130 is molded by guiding the fiber-reinforced resin from the submarine gate 151c serving as the gate solely provided in the mold 150.

The method of manufacturing the spring guide 100 is provided, and in the molding step, the first rib 130 is molded such that the first rib 130, the submarine gate 151c, and the center axis O of the barrel portion 112 are positioned in the straight line.

In these configurations, the first rib 130 is formed so as to project out from the first weld portion 145 towards the outer circumference of the spring guide 100. In other words, the first rib 130 is molded by guiding the fiber-reinforced resin, the flows of which have been joined when the barrel portion 112 is formed. Thus, because the size of the first weld portion 145 formed on the barrel portion 112 at the time of the injection molding can be reduced, it is possible to improve the strength of the barrel portion 112.

The spring guide 100 further includes the hub 113 serving as the guide portion that is formed so as to project out from the base portion 110 towards the surface and that comes into contact with the inner circumference of the coil spring at the outer circumferential surface thereof to define the position of the coil spring, and in the molding step, the hub 113 is molded by guiding the fiber-reinforced resin from the first joining position 196.

In this configuration, the hub 113 that defines the position of the coil spring is molded by guiding the fiber-reinforced resin from the first joining position 196 at which the flows of the fiber-reinforced resin join in the barrel-portion molding region 195. In other words, the hub 113 is molded so as to be continuous with the portion of the barrel portion 112 whose strength tends to be lowered at the time of the injection molding. Thus, by molding the hub 113, it is possible to improve the strength of the barrel portion 112.

The spring guide 100 is characterized in that it further includes: the drain hole 114 formed in the base portion 110 to discharge the liquid accumulated in the base portion 110; and the second rib 140 that is formed on the base portion 110 so as to be continuous with the drain hole 114, and in the molding step, the second rib 140 is molded such that the center axis of the drain hole 114 is positioned between the second rib 140 and the submarine gate 151c.

In this configuration, even with the spring guide 100 in which the base portion 110 has the drain hole 114, because the second rib 140 is molded such that the center axis of the drain hole 114 is positioned between the second rib 140 and the submarine gate 151c, it is possible to allow the weld formed at the time of the injection molding to be positioned within the second rib 140. Thus, it is possible to improve the strength of the base portion 110.

Embodiments of the present invention were described above, but the above embodiments are merely examples of applications of the present invention, and the technical scope of the present invention is not limited to the specific constitutions of the above embodiments.

With respect to the above description, the contents of application No. 2021-205041, with a filing date of Dec. 17, 2021 in Japan, are incorporated herein by reference.

The invention claimed is:

1. A spring guide made of fiber-reinforced resin, comprising:
   a disc-shaped base portion configured to support a coil spring, the coil spring being configured to elastically support a vehicle body;
   a barrel portion through which a cylinder of a shock absorber is inserted; and
   a first rib formed so as to project out towards an outer circumference of the spring guide from a first weld portion formed on an inner circumference of the barrel portion, wherein
   in the barrel portion, the fiber-reinforced resin is oriented in a circumferential direction.

2. The spring guide according to claim 1, further comprising
   a guide portion formed so as to project out from a surface of the base portion, the guide portion being configured such that an outer circumferential surface of the guide portion faces an inner circumference of the coil spring and defines a position of the coil spring, wherein
   the guide portion is formed so as to be continuous with a first weld portion formed on an inner circumference of the barrel portion.

3. A spring guide made of fiber-reinforced resin, comprising:
   a disc-shaped base portion configured to support a coil spring, the coil spring being configured to elastically support a vehicle body;
   a barrel portion through which a cylinder of a shock absorber is inserted;
   a drain hole formed in the base portion, the drain hole being configured to discharge liquid accumulated in the base portion; and
   a second rib formed so as to project out towards an outer circumference of the spring guide from a second weld portion formed on an inner circumference of the drain hole, wherein
   in the barrel portion, the fiber-reinforced resin is oriented in a circumferential direction.

4. A method of manufacturing a spring guide made of fiber-reinforced resin, the spring guide comprising: a disc-shaped base portion configured to support a coil spring, the coil spring being configured to elastically support a vehicle body; and a barrel portion through which a cylinder of a shock absorber is inserted, the method comprising:
   a molding step of injecting the fiber-reinforced resin into a mold for injection molding so as to flow in a circumferential direction of the barrel portion, wherein
   the spring guide further comprises a first rib formed so as to project out towards an outer circumference of the spring guide from a first weld portion formed as flows of the fiber-reinforced resin are joined when the barrel portion is formed, and
   in the molding step, the first rib is molded by guiding the fiber-reinforced resin from the gate solely provided in the mold.

5. The method of manufacturing the spring guide according to claim 4, wherein
   in the molding step, the first rib is molded such that the first rib, the gate, and a center axis of the barrel portion are positioned in a straight line.

6. The spring guide according to claim 3, further comprising:
   a guide portion formed so as to project out from a surface of the base portion, the guide portion being configured such that an outer circumferential surface of the guide portion faces an inner circumference of the coil spring and defines a position of the coil spring, wherein
   the guide portion is formed so as to be continuous with a first weld portion formed on an inner circumference of the barrel portion.

* * * * *